United States Patent
Nishiwaki

(10) Patent No.: US 10,078,153 B2
(45) Date of Patent: Sep. 18, 2018

(54) METHOD OF CONTROLLING SENSOR SYSTEM

(71) Applicant: Mitsubishi Electric Corporation, Tokyo (JP)

(72) Inventor: Hikaru Nishiwaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 39 days.

(21) Appl. No.: 15/310,855

(22) PCT Filed: Jun. 6, 2014

(86) PCT No.: PCT/JP2014/065148
§ 371 (c)(1),
(2) Date: Nov. 14, 2016

(87) PCT Pub. No.: WO2015/186259
PCT Pub. Date: Dec. 10, 2015

(65) Prior Publication Data
US 2017/0090067 A1    Mar. 30, 2017

(51) Int. Cl.
*G01V 13/00*    (2006.01)
*G01V 8/20*    (2006.01)

(52) U.S. Cl.
CPC .............. *G01V 13/00* (2013.01); *G01V 8/20* (2013.01)

(58) Field of Classification Search
CPC .................................. G01K 1/00; G01K 1/16
See application file for complete search history.

(56) References Cited

U.S. PATENT DOCUMENTS

| | | | |
|---|---|---|---|
| 6,717,515 B1 | 4/2004 | Osako et al. | |
| 2003/0231317 A1* | 12/2003 | Sepulveda Carlos | .... G01K 1/16 356/614 |
| 2004/0124337 A1 | 7/2004 | Gondo et al. | |
| 2011/0018722 A1 | 1/2011 | Uozumi et al. | |

FOREIGN PATENT DOCUMENTS

| | | |
|---|---|---|
| DE | 10239222 A1 | 3/2004 |
| DE | 10341327 A1 | 5/2004 |
| DE | 102010032042 A1 | 1/2011 |

(Continued)

OTHER PUBLICATIONS

Communication dated Nov. 14, 2017, issued by the Korean Intellectual Property Office in corresponding Korean Application No. 10-2016-7030446.

(Continued)

*Primary Examiner* — Luke D Ratcliffe
(74) *Attorney, Agent, or Firm* — Sughrue Mion, PLLC; Richard C. Turner

(57) ABSTRACT

A method of controlling a sensor system of an embodiment is a method of controlling a sensor system that includes a plurality of sensors to acquire a physical quantity according to existence of an object to be detected and that determines whether there is the object to be detected based on a sensing level that is the physical quantity multiplied by a gain parameter, the method including: adjusting the gain parameter in such a manner that the sensing level is equalized among the plurality of sensors in a case where there is no workpiece in a detection range of any of the plurality of sensors.

12 Claims, 3 Drawing Sheets

(56) References Cited

FOREIGN PATENT DOCUMENTS

| EP | 0486430 A2 | 5/1992 | | |
|---|---|---|---|---|
| JP | 2000-035310 A | 2/2000 | | |
| JP | 2004-101446 A | 4/2004 | | |
| JP | 2004-320372 A | 11/2004 | | |
| JP | 2007-013526 A | 1/2007 | | |
| JP | 2007-142627 A | 6/2007 | | |
| JP | 2008-028779 A | 2/2008 | | |
| JP | 2009-168492 A | 7/2009 | | |
| JP | 2009-168492 | * | 9/2009 | .............. G01V 8/20 |
| JP | 2013-113698 A | 6/2013 | | |

OTHER PUBLICATIONS

Decision of Rejection for Amendment dated Jan. 4, 2018 from the Korean Intellectual Property Office in counterpart application No. 10-2016-7030446.
Notice of Final Rejection dated Jan. 4, 2018 from the Korean Intellectual Property Office in counterpart application No. 10-2016-7030446.
Communication dated Nov. 17, 2017, issued by the German Patent Office in counterpart German Application No. 112014006728.8.
Communication dated Jul. 28, 2017, issued by the Korean Intellectual Property Office in corresponding Korean Application No. 10-2016-7030446.
Communication dated Sep. 20, 2017, from the State Intellectual Property Office of People's Republic of China in counterpart Application No. 201480079486.0.
Notification of Reason for Refusal of Japanese Patent Application No. 2016-525659 dated Aug. 16, 2016.
International Search Report of PCT/JP2014/065148 dated Aug. 12, 2014 [PCT/ISA/210].

* cited by examiner

METHOD OF CONTROLLING SENSOR SYSTEM

CROSS REFERENCE TO RELATED APPLICATIONS

This application is a National Stage of International Application No. PCT/JP2014/065148, filed Jun. 6, 2014, the contents of which are incorporated herein by reference in its entirety.

FIELD

The present invention relates to a method of controlling a sensor system that includes a plurality of sensors.

BACKGROUND

Conventionally, an automatic adjustment of a parameter such as a threshold of a sensing level of various sensors such as a photoelectric sensor is performed for each individual sensor. However, in environment, which can be assumed to be identical in a production site, such as a periphery of a production facility, the same line, or a limited area in a factory, a plurality of same kind of sensors of the same product type is generally arranged and used in consideration of unification of a spare part and a usage, or an advantage in a cost.

CITATION LIST

Patent Literature

Patent Literature 1: Japanese Patent Application Laid-Open No. 2004-101446
Patent Literature 2: Japanese Patent Application Laid-Open No. 2000-35310
Patent Literature 3: Japanese Patent Application Laid-Open No. 2004-320372

SUMMARY

Technical Problem

In a case where an automatic adjustment of a parameter is performed for each sensor in a condition in which a plurality of same kind of sensors is used in environment assumed to be identical, a cause or timing of generation of a parameter adjustment is not fed back to a system including a sensor network. Thus, even when a parameter adjustment is performed for a certain sensor, contents of the parameter adjustment is not reflected on other sensors causing inefficiency. In addition, since a record of a parameter adjustment is not left, it is not possible to make use of a problem, which has occurred in a production facility or a surrounding environment, for investigation of a cause or for analysis.

The present invention is made in view of the foregoing and is to acquire a method of controlling a sensor system that can prevent a production facility from stopping frequently due to detection of a foreign object or the like and to contribute to improvement in an operation rate of the production facility and a reduction of maintenance man-hours.

Solution to Problem

To solve the above described problem and achieve the object, a method of controlling a sensor system according to the present invention includes a plurality of sensors to acquire a physical quantity according to existence of an object to be detected and that determines whether there is the object to be detected based on a sensing level that is the physical quantity multiplied by a gain parameter. The method includes: adjusting the gain parameter in such a manner that the sensing level is equalized among the plurality of sensors in a case where there is no workpiece in a detection range of any of the plurality of sensors.

Advantageous Effects of Invention

According to a method of controlling a sensor system of the present invention, it is possible to prevent a production facility from stopping frequently due to detection of a foreign object or the like and to contribute to improvement in an operation rate of the production facility and a reduction of the number of maintenance man-hours.

DESCRIPTION OF EMBODIMENTS

In the following, embodiments of a method of controlling a sensor system according to the present invention will be described in detail with reference to the drawings. Note that the present invention is not limited to these embodiments.

First Embodiment

Figure 1:
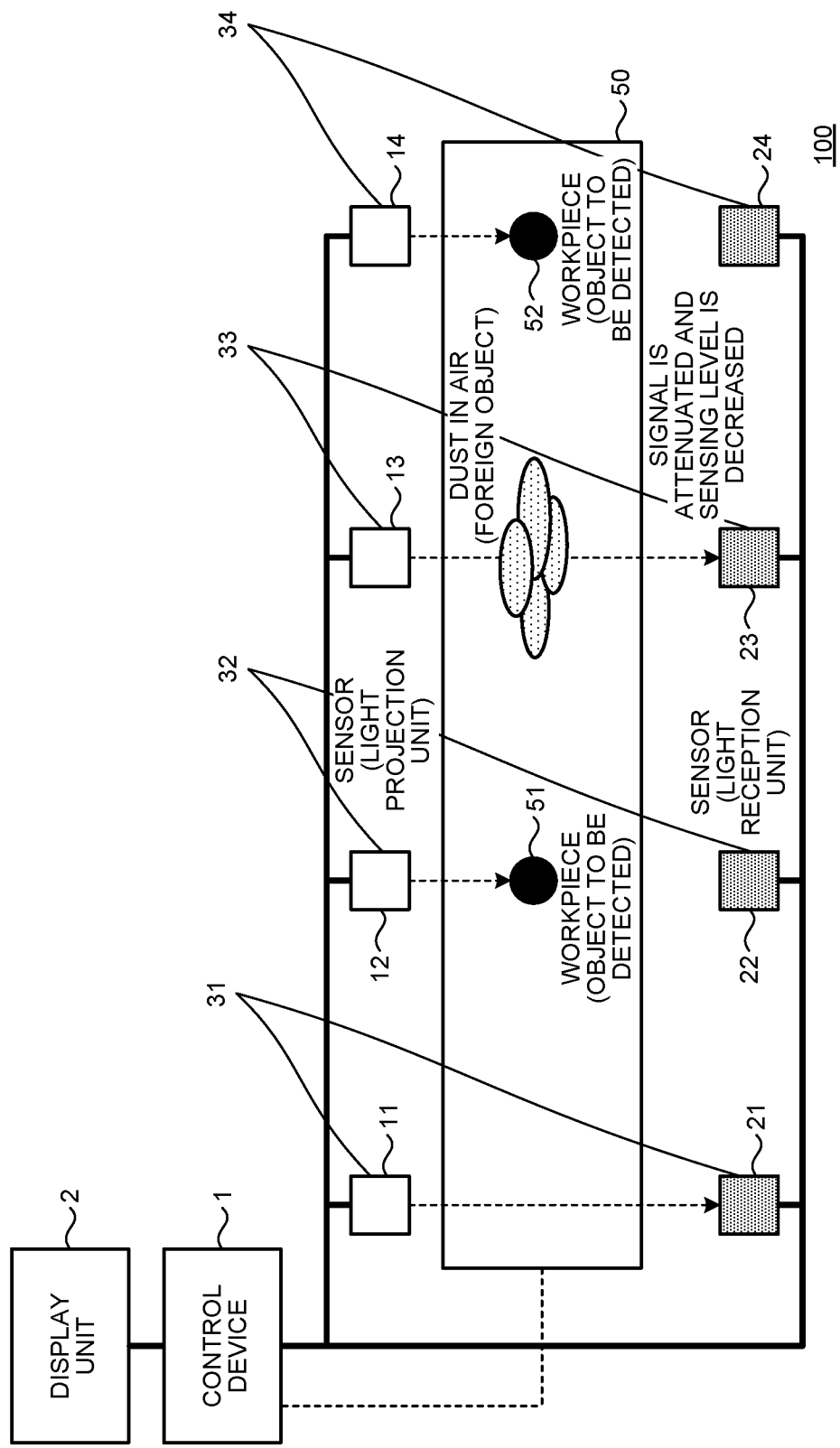
FIG. 1 is a view illustrating a configuration of a sensor system according to a first embodiment of the present invention.

FIG. 1 is a view illustrating a configuration of a sensor system 100 according to the first embodiment of the present invention. The sensor system 100 includes a sensor network including a plurality of photoelectric sensors 31 to 34 for example such as fiber sensors, and a control device 1. The sensor system 100 further includes a display unit 2 such as a monitor connected to the control device 1. The control device 1 is a control instrument such as a PLC and the like. Each of the photoelectric sensors 31 to 34 includes a light projection unit and a light reception unit. That is, the photoelectric sensor 31 includes a light projection unit 11 and a light reception unit 21, the photoelectric sensor 32 includes a light projection unit 12 and a light reception unit 22, the photoelectric sensor 33 includes a light projection unit 13 and a light reception unit 23, and the photoelectric sensor 34 includes a light projection unit 14 and a light reception unit 24.

The sensor system 100 is applied, for example, to a production line 50. More specifically, workpieces 51 and 52 to be detected by the sensor system 100 flow on the production line 50 and are detected by the photoelectric sensors 31 to 34. The production line 50 is also controlled by the control device 1. The sensor system 100 monitors positions and the number of workpieces 51 and 52 flowing on the production line 50 with the plurality of photoelectric sensors 31 to 34.

The control device 1 determines that each of the photoelectric sensors 31 to 34 is ON, namely, in a state of receiving light in a case where there is no object to be detected between the light projection units 11 to 14 and the light reception units 21 to 24; and a sensing level corresponding to a quantity of received light being a physical quantity in each of the light reception units 21 to 24 is equal to or larger than a predetermined threshold. The sensing level is a numeric value that relatively indicates an object to be detected by a sensor. An object to be detected by the photoelectric sensors 31 to 34 is light and an object to be detected by a proximity sensor (described later) is magnetism or impedance. As the sensing level, values to which margins are given adequately with respect to a threshold of ON that is a state of receiving light and a threshold of OFF that is a state of not receiving light are respectively defined as 100 and 0. For example, a quantity of received light of each of the photoelectric sensors 31 to 34 is multiplied by a gain parameter given to each of the photoelectric sensors 31 to 34 in the control device 1, whereby a sensing level of each sensor is acquired. A gain parameter is a parameter of setting an amplification factor of gain of a sensor. For example, in the photoelectric sensors 31 to 34, it is possible to perform detection with a sensing level as 100 even in a case of a small quantity of received light by setting a large amplification factor. For example, when the maximum quantity of light, which can be normally received by each of the light reception units 21 to 24, in a quantity of light emitted from each of the light projection units 11 to 14 is received by each of the light reception units 21 to 24, the control device 1 determines that the photoelectric sensors 31 to 34 are ON, namely, in the state of receiving light; and the control device 1 determines that there is no object to be detected between the light projection units 11 to 14 and the light reception units 21 to 24.

Figure 2:
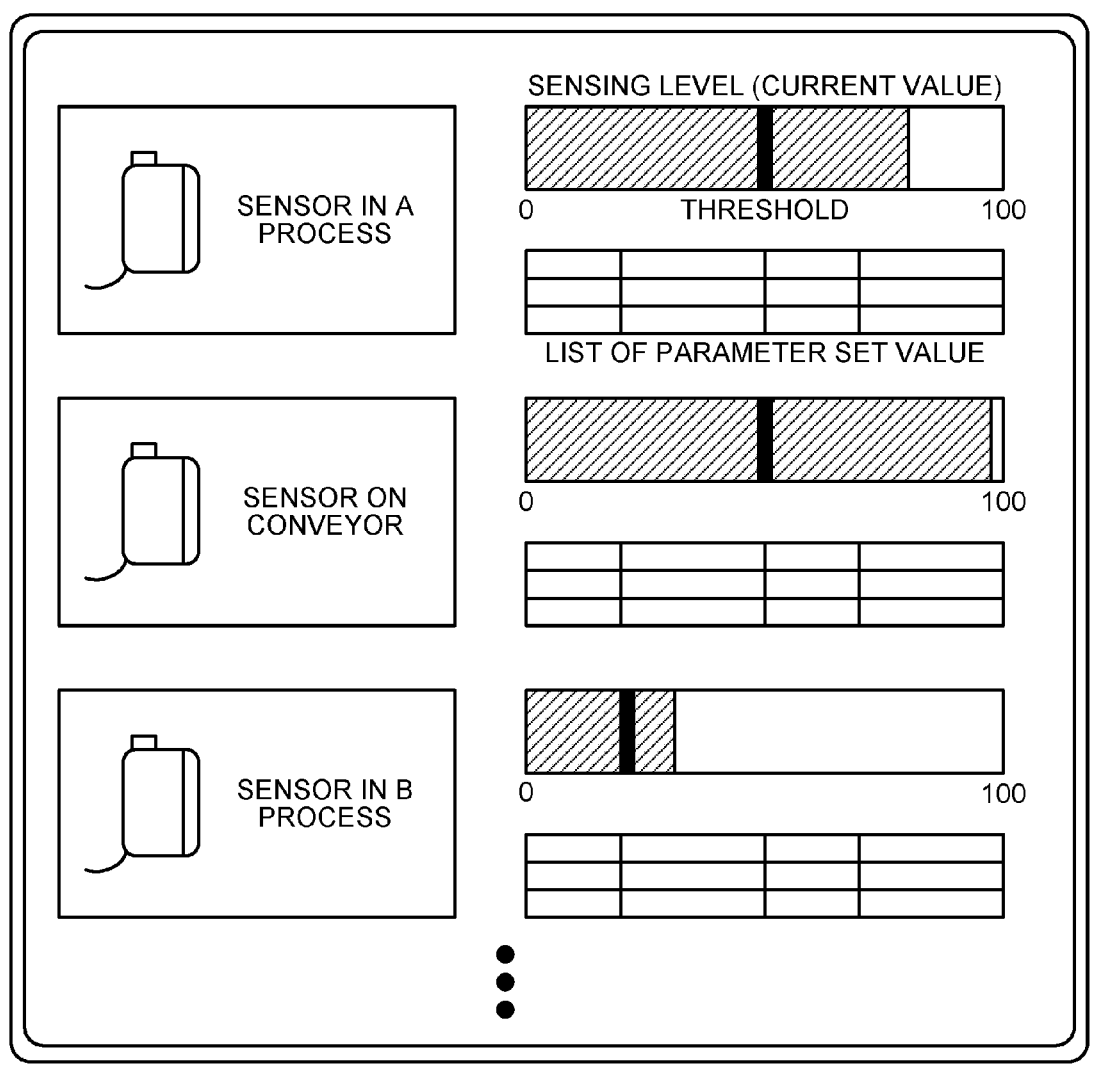
FIG. 2 is a view illustrating an example of a state of a display screen of a display unit according to the first embodiment of the present invention.

On the other hand, when the light emitted from each of the light projection units 11 to 14 is blocked by the workpieces 51 and 52 and a sensing level corresponding to a quantity of received light in each of the light reception units 21 to 24 is lower than a predetermined threshold, the control device 1 determines that the photoelectric sensor whose sensing level is lower than the predetermined threshold among the photoelectric sensors 31 to 34 is OFF, namely, in the state of not receiving light; and the control device 1 detects that there exist the workpieces 51 and 52 between a light projection unit and a light reception unit of the photoelectric sensor. In FIG. 1, a state in which there exist the workpieces 51 and 52 between the light projection units 12 and 14 and the light reception units 22 and 24 of the photoelectric sensors 32 and 34 is illustrated. In FIG. 2, an example of a state of a display screen of the display unit 2 is illustrated. A list of parameter set values including a relationship between a sensing level and a threshold, and a gain parameter (described later) is illustrated for each photoelectric sensor in FIG. 2.

However, in a case where a phenomenon of decreasing a quantity of received light being a physical quantity, such as a phenomenon of attenuating light that is a signal is generated between the light projection unit 13 and the light reception unit 23 as in a case of the photoelectric sensor 33, a sensing level is decreased regardless of existence of the workpieces 51 and 52. As the phenomenon of decreasing a quantity of received light that is a physical quantity, for example, a case where a foreign object such as dust or water vapor in the air is generated between the light projection unit 13 and the light reception unit 23, a case where a lens of the light projection unit 13 or the light reception unit 23 becomes dirty, or a case where an axis of light emitted from the light projection unit 13 to the light reception unit 23 is deviated is considered.

In such a case, even when there is no workpiece 51 or 52 between the light projection unit 13 and the light reception unit 23, in a case where a sensing level becomes lower than a value of a predetermined threshold, the control device 1 determines that the photoelectric sensor 33 is OFF, namely, in the state of not receiving light. When the control device 1 determines that the photoelectric sensor 33 is OFF, namely, in the state of not receiving light, it is determined that there is a trouble on an operation sequence that is based on a program performed by the control device 1. That is, on a program executed by a control instrument such as a PLC, it is determined that there is a workpiece at a place where the workpiece is not supposed to be at this timing and that a trouble has occurred, whereby the production line 50 is stopped and production activity is disrupted. In a case where a phenomenon of decreasing a sensing level continues, the production line 50 is stopped frequently.

Thus, in the method of controlling a sensor system according to the first embodiment, the control device 1 constantly collects a value of a sensing level of each of the photoelectric sensors 31 to 34 and automatically adjusts a gain parameter of each of the photoelectric sensors 31 to 34 constantly based on the information. More specifically, when there is no object to be detected between the light projection units 11 to 14 and the light reception units 21 to 24, gain in a case of converting a quantity of light emitted from each of the light projection units 11 to 14 or a quantity of light received in each of the light reception units 21 to 24 into a sensing level is adjusted in such a manner that sensing levels corresponding to quantities of received light in the light reception units 21 to 24 become substantially the same value. That is, in a case where there is no object to be detected in a detection range of the photoelectric sensors 31 to 34, conversion of a physical quantity, which is acquired in response to existence of an object to be detected in each of the photoelectric sensors 31 to 34, into a sensing level is adjusted in such a manner that sensing levels of the photoelectric sensors 31 to 34 are uniformed. That is, a gain parameter is adjusted in such a manner that sensing levels in the photoelectric sensors 31 to 34 are equalized. Here, a gain parameter of each of the photoelectric sensors 31 to 34 is gain or the like in each of the light reception units 21 to 24.

It is possible to change a quantity of received light that is a physical quantity in each of the photoelectric sensors 31 to 34 by adjusting a quantity of light emitted from each of the light projection units 11 to 14. Thus, in a case where there is no object to be detected in a detection range of the photoelectric sensors 31 to 34, it is possible to adjust a quantity of light emitted from the light projection units 11 to 14, being a physical parameter of each of the photoelectric sensors 31 to 34, in such a manner that sensing levels of the photoelectric sensors 31 to 34 are uniformed. In this case, a quantity of light emitted from each of the light projection units 11 to 14 is adjusted instead of a gain parameter in the following description.

More specifically, in a method of adjusting a gain parameter, for example, when sensing levels of the photoelectric sensors 31 to 34 are 90, 100, 70, and 100 (unit is % or arbitrary unit), respectively, in a case where there is no object to be detected between the light projection units 11 to 14 and the light reception units 21 to 24, the control device 1 adjusts a gain parameter of the photoelectric sensor 31 in such a manner that a sensing level of the light reception unit 21 becomes 100, that is, 100/90 times higher and adjusts a gain parameter of the photoelectric sensor 33 in such a manner that a sensing level of the light reception unit 23 becomes 100, that is, 100/70 times higher. In this case, a predetermined threshold is, for example, 50. That is, in a case where a sensing level is equal to or higher than 50, the control device 1 determines that the photoelectric sensor is ON, that is, in the state of receiving light. Also, in a case where the sensing level is lower than 50, the control device 1 determines that the photoelectric sensor is OFF, that is, in the state of not receiving light.

For example, in the operation sequence of the control device 1 on the production line 50, there is a case where an operation is performed by exclusive OR. Performing an operation by the exclusive OR is, for example, performing an operation in such a manner that there is no workpiece on a conveyor between processes or the like in a case where there is a plurality of processes such as an A process, a B process, and the like and there is one workpiece in each process.

More specifically, the photoelectric sensor 31 is provided to detect an object on a conveyor, the photoelectric sensor 32 is provided to detect a workpiece 51 in the A process, the photoelectric sensor 33 is provided to detect an object on the conveyor, and the photoelectric sensor 34 is provided to detect a workpiece 52 in the B process. In this case, exclusiveness that the photoelectric sensors 31 and 33 detect nothing when the photoelectric sensors 32 and 34 detect the workpieces 51 and 52 is established. Thus, in a case where a sensing level of the photoelectric sensor 33 is lower than 100 when the photoelectric sensors 32 and 34 detect the workpieces 51 and 52, the control device 1 controls the gain parameter in such a manner that the sensing level of the photoelectric sensor 33 becomes 100.

In a case where it is obvious that there is only one workpiece in a range of a plurality of photoelectric sensors to be adjusted and when it is known that the workpiece is at a position detected by any of the photoelectric sensors at certain timing, it is determined that only a photoelectric sensor with the lowest sensing level is OFF, that is, in the state of not receiving light and the other photoelectric sensors to be adjusted is ON, namely, in the state of receiving light. In a case where a sensing level of a photoelectric sensor that is supposed to be ON is lower than 100, the control device 1 adjusts the gain parameter in such a manner that the sensing level becomes 100.

There is a case where the number of workpieces in a range of a plurality of photoelectric sensors to be adjusted is obvious based on a program that describes an operation sequence performed by the control device 1. In this case, when it is known that all of these workpieces are at a position detected by any of the photoelectric sensors at certain timing, it is determined that photoelectric sensors which are in the state of not receiving light in ascending order of sensing levels are OFF, and the other photoelectric sensors to be adjusted are ON, namely, in the state of receiving light. In a case where a sensing level of a photoelectric sensor that is supposed to be ON is less than 100, the control device 1 adjusts the gain parameter such that the sensing level of the photoelectric sensor that is supposed to be ON becomes 100.

That is, sensing levels of a plurality of photoelectric sensors are lined up in descending order, photoelectric sensors the number of which is the number of photoelectric sensors from which the number of workpieces that are known to be existent is subtracted are selected, and only the selected photoelectric sensors become objects to be adjusted.

In the above, a gain parameter is adjusted with respect to a decrease in a sensing level that is not related to existence of a workpiece. However, it is possible to acquire a substantially similar effect also by adjusting a predetermined threshold set with respect to a sensing level. More specifically, for example, in the photoelectric sensor 31, in a case where there is no object to be detected between the light projection unit 11 and the light reception unit 21 and when a sensing level of the photoelectric sensor 31 is 90 (unit is % or arbitrary unit), the control device 1 adjusts a threshold of the photoelectric sensor 31 to be 90/100 times larger. That is, a threshold is adjusted in such a manner that a ratio of a sensing level and the threshold in a case where there is no object to be detected is substantially identical and is uniformed among the sensors.

However, as described above, when various parameters such as a gain parameter or a threshold of a sensor are changed according to a surrounding environment such as dust in the air and the state is kept, there may be a case where an original function of a sensor such as detection of a position and number of workpieces and detection of a foreign object is not performed. Thus, an upper limit value and a lower limit value are prescribed with respect to an adjustment value of a gain parameter, a physical parameter, or a threshold and an adjustment range is set. In a case where variation exceeding the adjustment range is generated, the control device 1 determines that a trouble has occurred, and notifies generation of a trouble to a user through the display unit 2. In a case where the number of times of exceeding the upper limit value and the lower limit value is equal to or larger than the predetermined number of times in a predetermined period or in a case where a period in which the upper limit value and the lower limit value are exceeded is longer than a predetermined period, it may be determined that a trouble has occurred.

Moreover, the control device 1 collects a log of an adjustment value of a gain parameter or a threshold. In a case where a certain pattern such as temporal periodicity is found in a variation of the gain parameter or the threshold by collection of a log, it may be determined that a trouble has occurred. Also, a variation in the gain parameter or the threshold is generated at time corresponding to predetermined timing on an operation sequence of the control device 1, it may be determined that a trouble has occurred. For example, in a usage environment in which the control device 1, the production line 50, or the like is provided, it becomes possible for a user to recognize an influence of an electric noise on the control device 1 or the production line 50 and to appropriately perform a removal of a noise source or a change in a position of providing the control device 1 or the production line 50. In such a manner, it becomes possible to solve a cause of a trouble in a production facility and to predict time of maintenance using a log of an adjustment value of a gain parameter or a threshold.

The more frequently maintenance of preventing a trouble in a production facility including a sensor system is performed the more effective the maintenance becomes. However, performing maintenance leads to problems such as an increase in man-hours for the maintenance and a decrease in production efficiency due to stopping of a facility are generated. According to the method of controlling a sensor system of the present invention, values of sensing levels of the same kind of sensors used in the same system are constantly monitored in utilization of a control instrument including a sensor and a sensor network and feedback is given to a parameter such as a gain parameter, a physical parameter, or a threshold, whereby automatic adjustment is comprehensively performed according to an environment. Accordingly, it becomes possible to optimize a frequency of maintenance, to prevent a production facility from being stopped frequently, to realize an improvement in efficiency of maintenance operation, and to realize an improvement in an operation rate of the production facility.

Then, according to the method of controlling a sensor system of the present invention, notification is given to a user in a case where a trouble has occurred in an adjustment value of a gain parameter or a threshold. Moreover, by collecting a log of an adjustment value and leaving a record of a parameter adjustment, it is possible to use the record for investigation of a cause in a case where a trouble has occurred in a facility or for an improvement in efficiency of maintenance operation.

Second Embodiment

Figure 3:
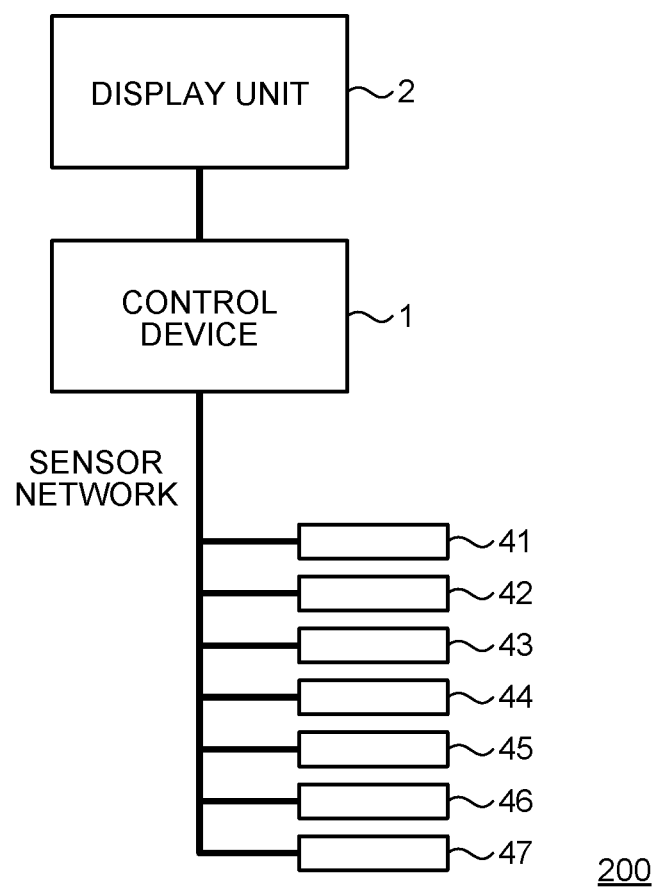
FIG. 3 is a view illustrating a configuration of a sensor system according to a second embodiment of the present invention.

FIG. 3 is a view illustrating a configuration of a sensor system 200 according to the second embodiment of the present invention. The sensor system 200 includes a sensor network including a plurality of sensors 41 to 47, and a control device 1. In the first embodiment, it has been described that sensors included in a sensor network are photoelectric sensors. However, as long as a sensor acquires a physical quantity according to existence of an object to be detected, it is not limited to the photoelectric sensors.

For example, each of the plurality of sensors 41 to 47 may be a proximity sensor. Each proximity sensor constantly oscillates during an operation and detects an object since energy gain that is a physical quantity is decreased when an object to be detected becomes closer. In each proximity sensor, a reaction distance at which a response to an object to be detected changes according to an oscillation frequency. Thus, an oscillation frequency changes and a reaction distance changes accordingly by an adjustment of an inductance L of a coil or a capacity C of a capacitor in an oscillation circuit.

In a case where the proximity sensors are used, for example, a value that is energy gain multiplied by a gain parameter becomes a sensing level. Also, in each proximity sensor, by adjusting the inductance L of the coil or the capacity C of the capacitor as a physical parameter of the oscillation circuit, it is possible to change energy gain that is a physical quantity. Thus, control of a sensor system similar to that in the first embodiment can be realized in a sensor network including a plurality of proximity sensors.

Moreover, the present invention is not limited to the above embodiments and can be modified in various manners within the spirit and the scope thereof in a practical phase. Also, various stages of the invention are included in the above embodiments and various inventions may be extracted by an arbitrary combination of a plurality of disclosed components. For example, even when some components are removed from all components described in the embodiments, a configuration from which these components are removed may be extracted as an invention in a case where it is possible to solve a problem described in a section of Technical Problem and an effect described in a section of Advantageous Effects of Invention is acquired. Furthermore, configuration elements of different embodiments may be arbitrarily combined.

INDUSTRIAL APPLICABILITY

As described above, a method of controlling a sensor system according the present invention is useful for a production facility including a sensor system and is specifically suitable for control of a sensor system that includes a sensor network including the same kind of sensors provided in a production line on which a workpiece moves.

REFERENCE SIGNS LIST 1 control device, 2 display unit, 11 to 14 light projection unit, 21 to 24 light reception unit, 31 to 34 photoelectric sensor, 50 production line, 51, 52 workpiece, 41 to 47 sensor, 100, 200 sensor system.

The invention claimed is:

1. A method of controlling a sensor system that includes, along a line, a plurality of sensors to acquire a physical quantity in detection ranges according to existence of a workpiece moving on the line, that determines whether there is the workpiece in the detection ranges based on a sensor-specific sensing level that is the physical quantity multiplied by a sensor-specific gain parameter, and in which the sensors are provided such that, when the workpiece is present in any of the detection ranges, there is no workpiece on the line excluding all the detection ranges, the method comprising:
for each sensor from among the plurality of sensors, monitoring the sensing level and selectively adjusting the corresponding sensor-specific gain parameter in such a manner that the sensor-specific sensing level is equalized among the plurality of sensors in a case where it is determined that there is no workpiece in any of the detection ranges, and in such a manner that when the workpiece is in any of the detection ranges, the corresponding sensor-specific gain parameter is not adjusted.

2. A method of controlling a sensor system that includes, along a line, a plurality of sensors to acquire a physical quantity in detection ranges based on a sensor-specific physical parameter according to existence of a workpiece moving on the line, that determines whether there is the workpiece in the detection ranges based on a sensor-specific sensing level converted from the physical quantity, and in which the sensors are provided such that, when the workpiece is present in any of the detection ranges, there is no workpiece on the line excluding all the detection ranges, the method comprising:
for each sensor from among the plurality of sensors, monitoring the sensing level and selectively adjusting the corresponding sensor-specific physical parameter in such a manner that the physical quantity is equalized among the plurality of sensors in a case where it is determined that there is no workpiece in any of the detection ranges, and in such a manner that when the workpiece is in any of the detection ranges, the corresponding sensor-specific physical parameter is not adjusted.

3. A method of controlling a sensor system that includes, along a line, a plurality of sensors to acquire a physical quantity in detection ranges according to existence of a workpiece moving on the line, that determines whether there is the workpiece in the detection ranges based on comparison between a sensor-specific sensing level converted from the physical quantity and a sensor-specific threshold of each of the sensors, and in which the sensors are provided such that, when the workpiece is present in any of the detection ranges, there is no workpiece on the line excluding all the detection ranges, the method comprising:
for each sensor from among the plurality of sensors, monitoring the sensing level and selectively adjusting the corresponding sensor-specific threshold in such a manner that a ratio of the sensor-specific sensing level and the sensor-specific threshold is equalized among the plurality of sensors in a case where it is determined that there is no workpiece in any of the detection ranges, and in such a manner that when the workpiece is in any of the detection ranges, the corresponding sensor-specific physical parameter is not adjusted.

4. The method of controlling a sensor system according to claim 1, wherein, when it is determined that the workpiece is present in any of the detection ranges, the sensors the number of which is equal to a value that is the number of sensors from which the number of workpieces in the detection ranges is subtracted are set as objects to be adjusted in descending order of values of the sensing levels of the sensors.

5. The method of controlling a sensor system according to claim 2, wherein, when it is determined that the workpiece is present in any of the detection ranges, the sensors the number of which is equal to a value that is the number of sensors from which the number of workpieces in the detection ranges is subtracted are set as objects to be adjusted in descending order of values of the sensing levels of the sensors.

6. The method of controlling a sensor system according to claim 3, wherein, when it is determined that the workpiece is present in any of the detection ranges, the sensors the number of which is equal to a value that is the number of sensors from which the number of workpieces in the detection ranges is subtracted are set as objects to be adjusted in descending order of values of the sensing levels of the sensors.

7. The method of controlling a sensor system according to claim 1, wherein generation of a trouble is notified to a user in a case where the gain parameter after the adjustment exceeds an adjustment range due to a presence of a foreign object within the sensor system or a deviation in a relative positioning of respective components within the sensor system.

8. The method of controlling a sensor system according to claim 2, wherein generation of a trouble is notified to a user in a case where the physical parameter after the adjustment exceeds an adjustment range due to a presence of a foreign object within the sensor system or a deviation in a relative positioning of respective components within the sensor system.

9. The method of controlling a sensor system according to claim 3, wherein generation of a trouble is notified to a user in a case where the threshold after the adjustment exceeds an adjustment range due to a presence of a foreign object within the sensor system or a deviation in a relative positioning of respective components within the sensor system.

10. The method of controlling a sensor system according to claim 1, wherein a result of the adjustment is recorded, a determination of a trouble caused by a presence of a foreign object within the sensor system or a deviation in a relative positioning of respective components within the sensor system is made based on the record, and generation of a trouble is notified to a user based on the determination.

11. The method of controlling a sensor system according to claim 2, wherein a result of the adjustment is recorded, a determination of a trouble caused by a presence of a foreign object within the sensor system or a deviation in a relative positioning of respective components within the sensor system is made based on the record, and generation of a trouble is notified to a user based on the determination.

12. The method of controlling a sensor system according to claim 3, wherein a result of the adjustment is recorded, a determination of a trouble caused by a presence of a foreign object within the sensor system or a deviation in a relative positioning of respective components within the sensor system is made based on the record, and generation of a trouble is notified to a user based on the determination.

* * * * *